(No Model.)
C. T. SHOEMAKER.
MANUFACTURE OF SAWS.
No. 324,600. Patented Aug. 18, 1885.
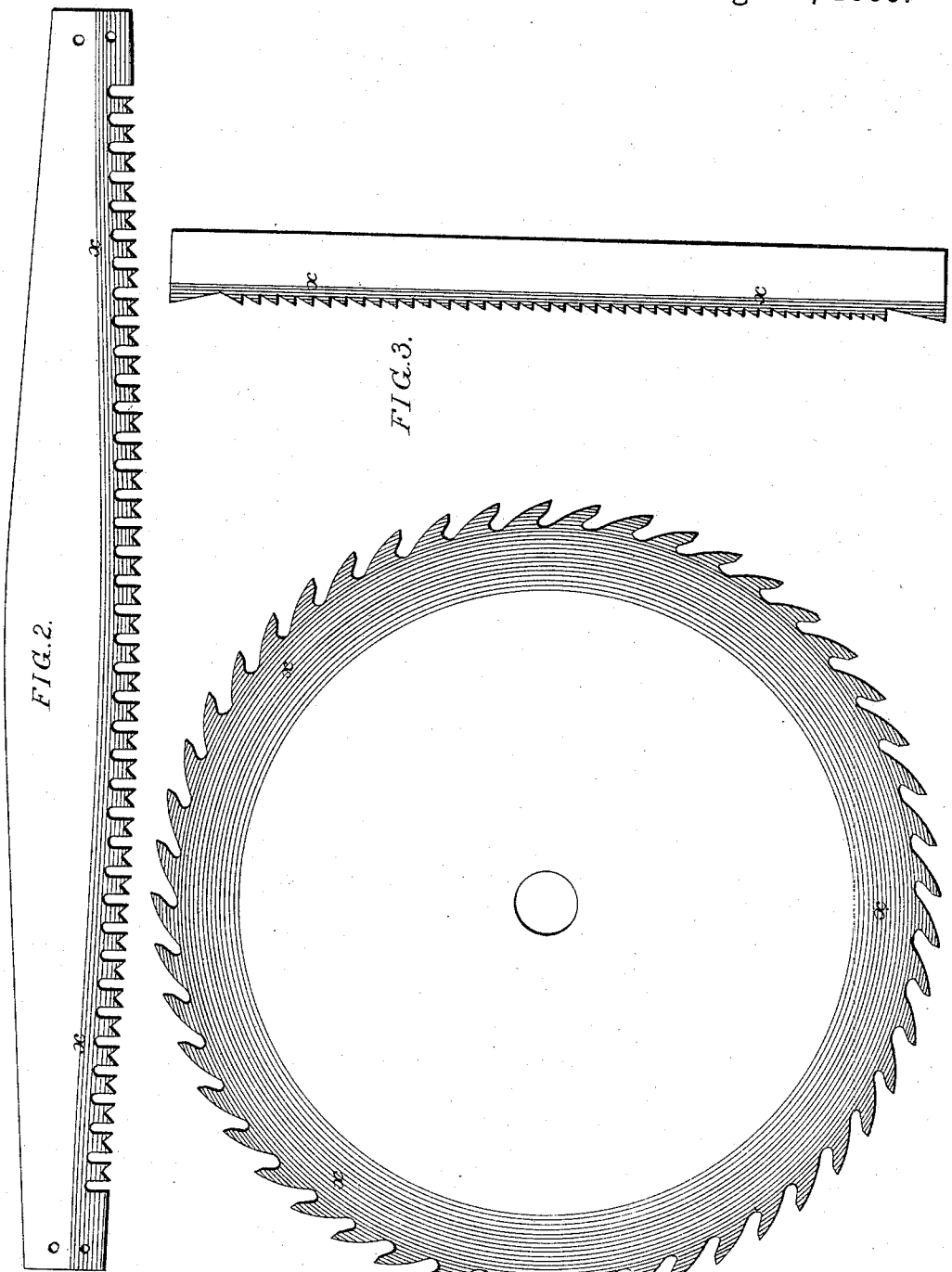

UNITED STATES PATENT OFFICE.

CHARLES T. SHOEMAKER, OF PHILADELPHIA, PENNSYLVANIA, ASSIGNOR TO HAMILTON DISSTON, HORACE C. DISSTON, WILLIAM DISSTON, AND JACOB S. DISSTON, ALL OF SAME PLACE.

MANUFACTURE OF SAWS.

SPECIFICATION forming part of Letters Patent No. 324,600, dated August 18, 1885.

Application filed May 28, 1885. (No model.)

*To all whom it may concern:*

Be it known that I, CHARLES T. SHOEMAKER, a citizen of the United States, and residing in Philadelphia, Pennsylvania, have invented certain Improvements in the Manufacture of Saws, of which the following is a specification.

The object of my invention is to produce a saw which will have a better cutting effect than a saw made in the usual way.

In the accompanying drawings, Figure 1 is a side view of a circular saw made in accordance with my invention, and Figs. 2 and 3, views, respectively, of a crosscut-saw and a gang-saw embodying the invention.

A saw-plate as it comes from the rolls is not true or of proper thickness throughout, and it is the usual practice in making saws to first tooth the saw-blade made from the plate, then to harden and temper the same, and finally to grind and polish both sides of the blade, so as to produce smooth surfaces throughout, and thus reduce the friction on the blade when the saw is at work, the grinding also rendering the blade true, and in the case of a circular saw insuring the proper balance of the same. The grinding and polishing of both faces of the saw throughout after the tempering of the blade is, however, objectionable, because it removes from the steel at and near the cutting-edge of the blade the hard surface or skin which is the result of the tempering operation, and which is best calculated to present and to retain a keen cutting-edge.

In carrying out my invention, therefore, I take the crude saw-blade and grind the same so as to render it perfectly true, the blade being then tempered, and both sides of the same subsequently subjected to a grinding and polishing operation. The grinding operation, however, does not affect the blade at and near the toothed edge, this portion of the blade being permitted to retain the surface due to the tempering operation, as indicated by the shaded portions *x* of the saw-blades shown in the drawings. This is permissible, because the blade has been trued by the preliminary grinding operation, and the subsequent grinding and polishing are merely for the purpose of imparting smooth surfaces to the blade.

While it is essential that the subsequent grinding shall not affect the blade at and near the cutting-edge, the final polishing operation may, if desired, include the entire blade.

As a result of my improved method of manufacture, the toothed portion of the saw presents the best possible cutting-edge, while the greater portion of the saw has ground and polished surfaces, as usual, so that when the saw is in use there is but little more friction than if the blade were ground and polished throughout.

I claim as my invention—

1. The within-described improvement in the mode of manufacturing saw-blades, said improvement consisting in first rendering the blade true by grinding, then tempering the blade, and finally grinding and polishing the same, as described, whereby the blade at and near the cutting-edge retains the surface due to the tempering operation, as set forth.

2. A saw-blade having at and near the cutting-edge a tempered surface and on the other portions of the blade a ground surface, as set forth.

In testimony whereof I have signed my name to this specification in the presence of two subscribing witnesses.

CHARLES T. SHOEMAKER.

Witnesses:
 HENRY BOSSERT,
 HARRY SMITH.